(12) United States Patent
Wigren

(10) Patent No.: US 8,306,091 B2
(45) Date of Patent: Nov. 6, 2012

(54) METHOD AND ARRANGEMENTS FOR NOISE RISE ESTIMATION

(75) Inventor: Karl Torbjorn Wigren, Uppsala (SE)

(73) Assignee: Telefonaktiebolget L M Ericsson (Publ), Stockholm (SE)

( * ) Notice: Subject to any disclaimer, the term of this patent is extended or adjusted under 35 U.S.C. 154(b) by 481 days.

(21) Appl. No.: 12/678,796

(22) PCT Filed: Sep. 19, 2007

(86) PCT No.: PCT/SE2007/050666
§ 371 (c)(1),
(2), (4) Date: Mar. 18, 2010

(87) PCT Pub. No.: WO2009/038508
PCT Pub. Date: Mar. 26, 2009

(65) Prior Publication Data
US 2010/0208770 A1 Aug. 19, 2010

(51) Int. Cl.
*H04B 17/00* (2006.01)
(52) U.S. Cl. .............. 375/141; 375/227; 455/67.13
(58) Field of Classification Search .......... 375/141, 375/146, 147, 227; 455/63.1, 67.13, 501
See application file for complete search history.

(56) References Cited

U.S. PATENT DOCUMENTS

| 8,005,433 B2* | 8/2011 | Wigren | 455/67.13 |
| 8,170,492 B2* | 5/2012 | Wigren et al. | 455/67.13 |
| 2008/0267086 A1* | 10/2008 | Wheatley et al. | 370/252 |
| 2012/0172074 A1* | 7/2012 | Booker et al. | 455/501 |

FOREIGN PATENT DOCUMENTS

WO   WO2007/024166 A1   3/2007

* cited by examiner

*Primary Examiner* — David B Lugo
(74) *Attorney, Agent, or Firm* — Roger S. Burleigh

(57) ABSTRACT

An arrangement (90) for noise rise estimation in a wireless communication system comprises a power measuring means (45) for measuring received total wideband power. A means (52) for computing estimates of a noise floor measure bases its computation on a number of the measured received total wideband powers. A means (80) for calculating values of a biased noise rise measure bases its calculations on a number of received total wideband powers or an estimation derived therefrom and a respective one of the estimates of a noise floor measure. A means (91) for providing a measure representing a long term behaviour of the values of the biased noise rise measure is provided. A means (93) for obtaining a value of a present, unbiased noise rise measure, bases its function on the measure representing a long term behaviour of the values of the biased noise rise measure. A corresponding method is also disclosed.

20 Claims, 6 Drawing Sheets

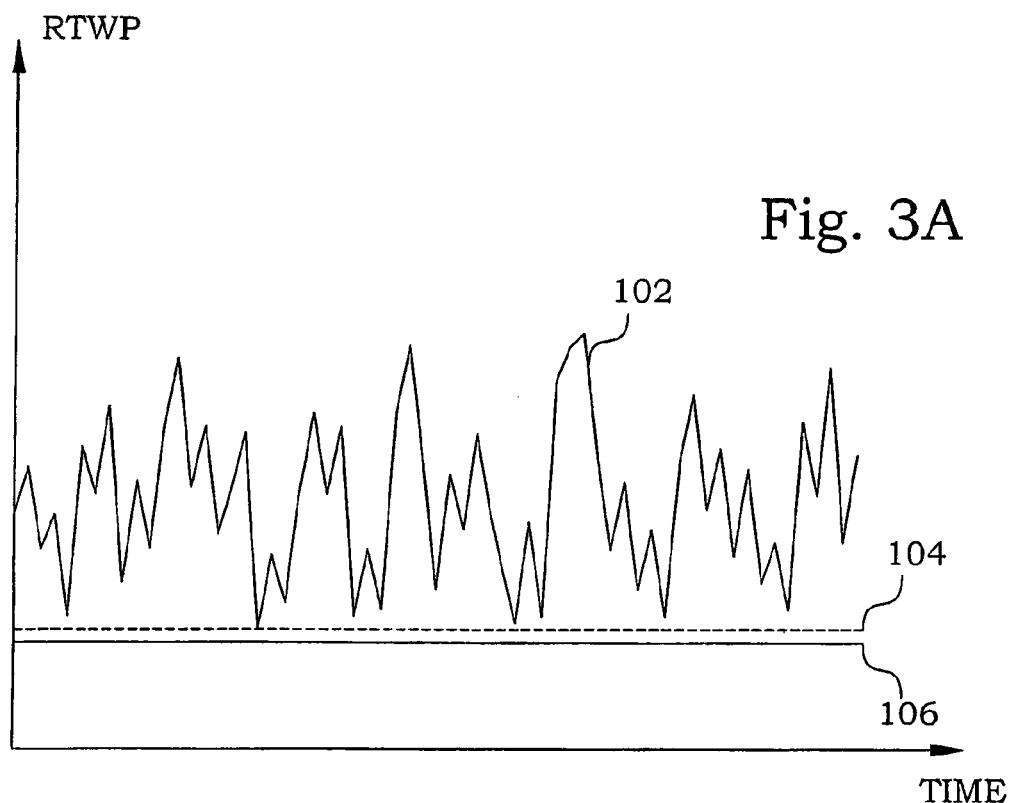
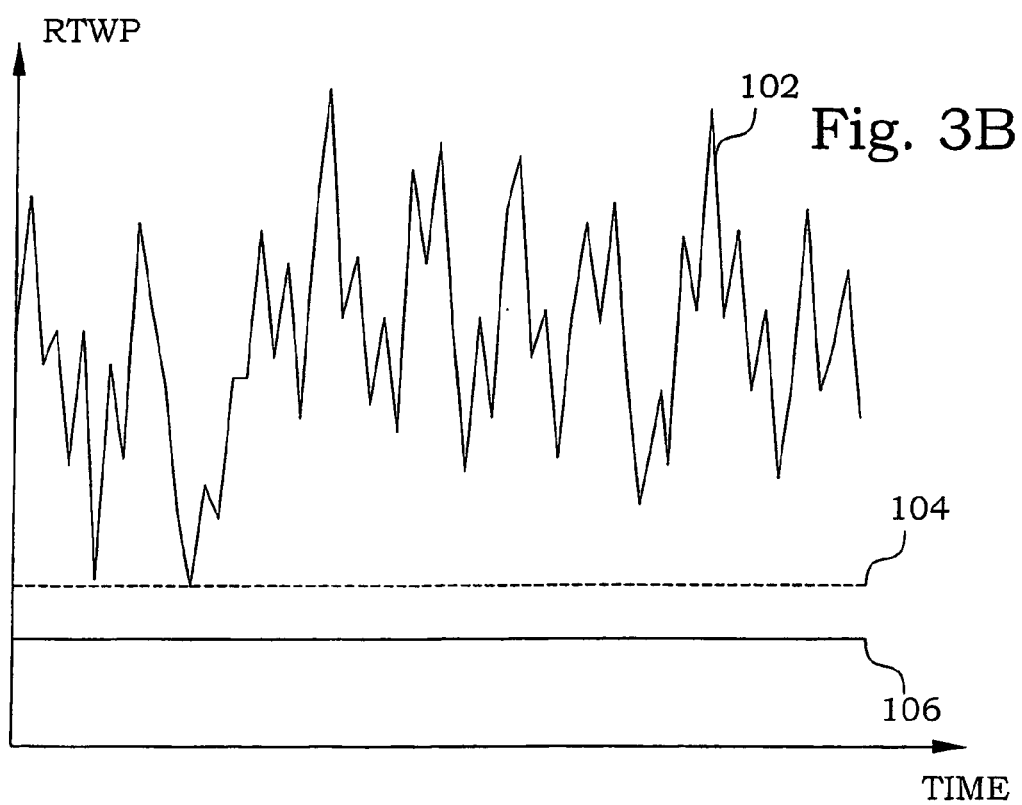

METHOD AND ARRANGEMENTS FOR NOISE RISE ESTIMATION

TECHNICAL FIELD

The present invention relates in general to methods and devices for estimation of load in cellular communications systems, and in particular to noise-rise estimation in code division multiple access communications systems.

BACKGROUND

Wideband Code Division Multiple Access (WCDMA) telecommunication systems have many attractive properties that can be used for future development of telecommunication services. A specific technical challenge in e.g. WCDMA and similar systems is the scheduling of enhanced uplink channels to time intervals where the interference conditions are favourable, and where there exist a sufficient capacity in the uplink of the cell in question to support enhanced uplink channels. It is well known that existing users of the cell all contribute to the interference level in the uplink of WCDMA systems. Further, terminals in neighbour cells also contribute to the same interference level. This is because all users and common channels of a cell transmit in the same frequency band when CDMA technology is used. The load of the cell is directly related to the interference level of the same cell.

In order to retain stability of a cell, the load needs to be kept below a certain level. This follows since the majority of uplink user channels, at least in WCDMA, are subject to power control. This power control aims at keeping J the received power level of each channel at a certain signal to interference ratio (SIR), in order to be able to meet specific service requirements. This SIR level is normally such that the received powers in the radio base station (RBS) are several dBs below the interference level. De-spreading in so called RAKE-receivers then enhance each channel to a signal level where the transmitted bits can be further processed, e.g. by channel decoders and speech codecs that are located later in the signal processing chain.

Since the RBS tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (E-UL) channel in WCDMA, so that one can insure that instability is avoided. In order to do so, the momentary load must be estimated in the RBS. This enables the assessment of the capacity margin that is left to the instability point.

The load of a cell in e.g. a CDMA system is usually referred to some quantity related to power, typically noise rise. A number of noise rise measures do exist. The most important one is perhaps the Rise over Thermal (RoT) that is defined as the quotient of the total interference of the cell and the thermal noise power floor of the receiver of the RBS. Other measures include e.g. in-band non-WCDMA interference with respect to the thermal noise floor. Consequently, power quantities, such as total power level and noise floor (ideally thermal noise floor), have to be determined.

It could furthermore be mentioned that an equally important parameter that requires load estimation for its control, is the coverage of the cell. The coverage is normally related to a specific service that needs to operate at a specific SIR to function normally. The uplink cell boundary is then defined by a terminal that operates at maximum output power. The maximum received channel power in the RBS is defined by the maximum power of the terminal and the pathloss to the digital receiver. Since the pathloss is a direct function of the distance between the terminal and the RBS, a maximum distance from the RBS results. This distance, taken in all directions from the RBS, defines the coverage.

It now follows that any increase of the interference level results in a reduced SIR that cannot be compensated for by an increased terminal power. As a consequence, the pathloss needs to be reduced to maintain the service. This means that the terminal needs to move closer to the RBS, i.e. the coverage of the cell is reduced.

From the above discussion it is clear that in order to maintain the cell coverage that the operator has planned for, it is necessary to keep the load below a specific level. This means that load estimation is important also for coverage. In particular load estimation is important from a coverage point of view in the fast scheduling of enhanced uplink traffic in the RBS.

Furthermore, the admission control and congestion control functionality in the radio network controller (RNC) that controls a number of RBSs also benefits from accurate information on the momentary noise rise of the cell. Admission control makes sure that the number of users in a cell does not become larger than what can be handled, in terms of hardware resources and in terms of load. A too high load first manifests itself in too poor quality of service, a fact that is handled by the outer power control loop by an increase of the SIR target. In principle this feedback loop may also introduce power rushes, as described in the previous section.

The admission control function can prevent both the above effects by regulation of the number of users and corresponding types of traffic that is allowed for each cell controlled by the RNC.

In order to regulate the number of users the RNC needs to have means for computation of a measure of the load of a cell. This measure of the load of the cell is then compared to a threshold, and new users are accepted if the load of the cell is predicted to remain below the threshold, after the tentative addition of the new user. An improved load measure for the admission control function is requested, so that a higher number of users can be accepted, without sacrificing cell stability limits.

One approach to improve load estimation is disclosed in the published international patent application WO 2006/076969. A minimum value of a power quantity, preferably a difference between the instantaneous total received wideband power and the instantaneous sum of powers of all links used in the same cell, is used as an estimate of an upper limit of the thermal noise floor. An optimal and soft algorithm for noise rise estimation based on a similar basic idea of minimum values is disclosed in the published international patent application WO 2007/024166. Complexity reduction procedures concerning such algorithms are further disclosed in the published international patent application WO 2007/055626.

These principles for estimation of the thermal noise power floor are performed by estimating the thermal noise power floor as a minimum of a measured or estimated power quantity comprising the thermal noise floor. This minimum is typically computed over a pre-determined interval of time. If no code power measurements are available, the power in question is the total received wideband power. One approach for achieving a noise rise measure would therefore be to calculate the noise rise as a division of a momentary total received wideband power with an established thermal noise floor power estimated as a minimum of the total received wideband power over a pre-determined interval of time. In all situations, it is certain that the minimum value constitutes an upper limit of the unknown noise floor.

However, for instance when only the received total wideband power is available, and not the individual code powers, the probability that all code power contributions, neighbour cell contributions and other external contributions at some occasion are equal to zero varies with the average load. If there is a reasonable probability that all code power contributions, neighbour cell contributions and other external contributions at some occasion are equal to zero, the minimum value is a good estimation of the "true" noise floor. However, at higher loads, the consequence is that the likelihood of total power measurements or estimations in the vicinity of the true noise floor will be reduced and the minimum value becomes a less good estimation. Consequently, a noise rise measure determined based on such a noise floor estimation will in general be underestimated, which in turn increases the risk for e.g. power rushes.

SUMMARY

A general problem with prior art load estimation is that determination of noise rise suffers from significant uncertainties, primarily caused by difficulties to estimate the true noise floor.

A general object of the present invention is to provide improved methods and arrangements for determining power-related quantities, e.g. for load estimation. A further object of the present invention is to provide methods and arrangements giving opportunities for more accurate determination of a noise floor measure independent on load.

The above objects are achieved with methods and devices according to the enclosed patent claims. In general words, in a first aspect, a method for noise rise estimation in a wireless communication system comprises measuring of at least received total wideband power a plurality of times. A plurality of estimates of a noise floor measure is computed. The computation is based on at least a number of the measured received total wide band powers. A plurality of values of a biased noise rise measure is calculated. The calculation is based at least on a number of said measured received total wideband powers and a respective one of the estimates of a noise floor measure. A measure representing a long term behaviour of the values of the biased noise rise measure is provided. A value of a present, unbiased, noise rise measure is obtained, based at least on the measure representing a long term behaviour of the values of the biased noise rise measure.

In a second aspect, an arrangement for noise rise estimation in a wireless communication system comprises a power measuring means for measuring at least received total wideband power a plurality of times. A means for computing estimates of a noise floor measure based on at least a number of the measured received total wideband powers is connected to the power measuring means. A means for calculating values of a biased noise rise measure, based at least on a number of the measured received total wideband powers or a quantity derived therefrom and a respective one of the estimates of a noise floor measure, is connected to the means for computing. A means for providing a measure representing a long term behaviour of the values of the biased noise rise measure is connected to the means for calculating. A means for obtaining a value of a present, unbiased noise rise measure, based at least on the measure representing a long term behaviour of the values of the biased noise rise measure is connected to the means for providing.

In a third aspect, a node for use in a wireless communication system comprises an arrangement according to the second aspect.

In a fourth aspect, a wireless communication system comprises an arrangement according to the second aspect.

An advantage with the present invention is that the accuracy of thermal noise floor estimation is improved in the sense that an appropriate performance is extended to a much wider operating load range while the complexity still is kept low and while no additional measured signals are requested to be provided. The bias function can be estimated individually for each cell and in case of antenna multi-branch applications for each antenna branch.

BRIEF DESCRIPTION OF THE DRAWINGS

The invention, together with further objects and advantages thereof, may best be understood by making reference to the following description taken together with the accompanying drawings, in which:

FIGS. 3A-B are time diagrams of received total wideband power at two different site communication throughput levels;

DETAILED DESCRIPTION

Figure 1:
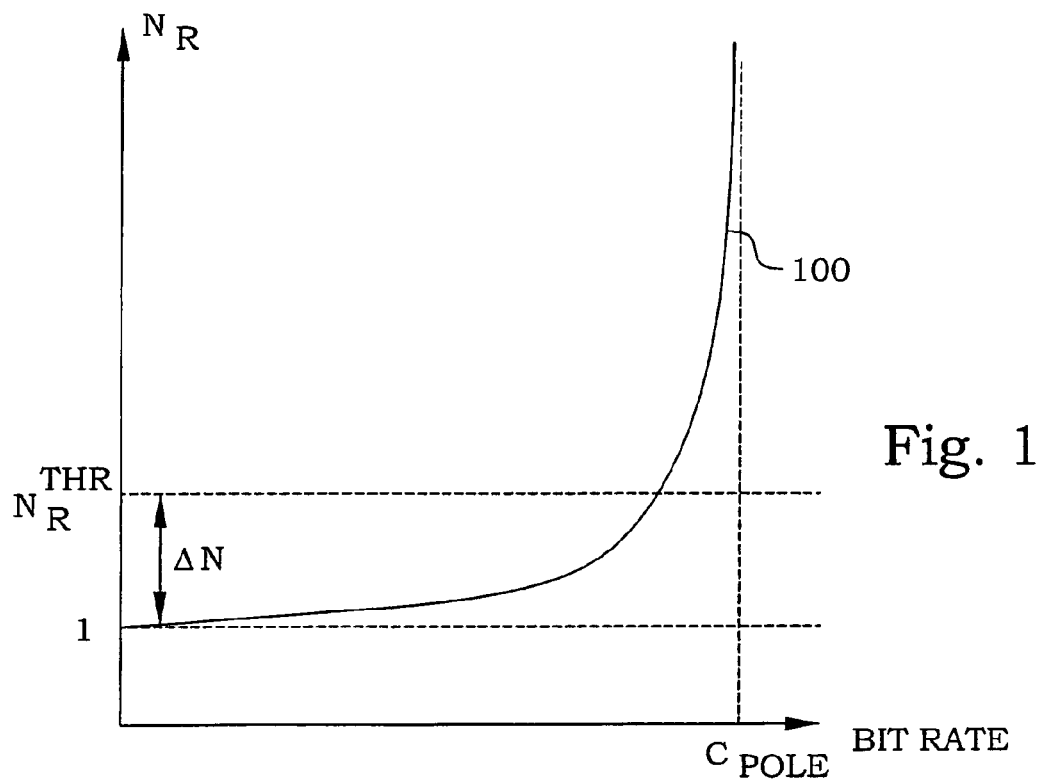
FIG. 1 illustrates a typical relation between noise rise and total bitrate in a cell.

Throughout the entire disclosure, bold letters in equations refer to vector or matrix quantities.

In the drawings, corresponding reference numbers are used for similar or corresponding parts.

The present detailed description benefits from a somewhat deeper understanding about how to perform load estimation and the problems connected thereto. Descriptions about reference and measurement points, power measurements, power control loops, noise rise, observability of noise floor, and noise rise estimations are found in WO 2007/024166 and are in a general sense also applicable to the present disclosure.

A first very brief overview of load estimation in wireless communication systems is also given here below.

FIG. 1 is a diagram illustrating conditions concerning load estimation. Noise rise $N_R$, defined as the ratio between a total power and a thermal noise level as measured at an antenna connector, also referred to as the noise floor, is a measure of the load. Above a noise rise threshold $N_R^{thr}$, the situation becomes unstable. A relation 100 between total bit rate and noise rise $N_R$ is known from the design of the control loops, and scheduling of additional channels can be performed once the instantaneous noise rise $N_R$ has been determined. The pole capacity, $C_{pole}$, denotes the maximum bitrate capacity in bits per second. A typical difference $\Delta N$ between the threshold $N_R^{thr}$ and the level defined by the thermal noise level is typically 7 dB. However, one of the objects of the present invention is to improve the accuracy of the determination of the noise floor or thermal noise level.

Figure 2:
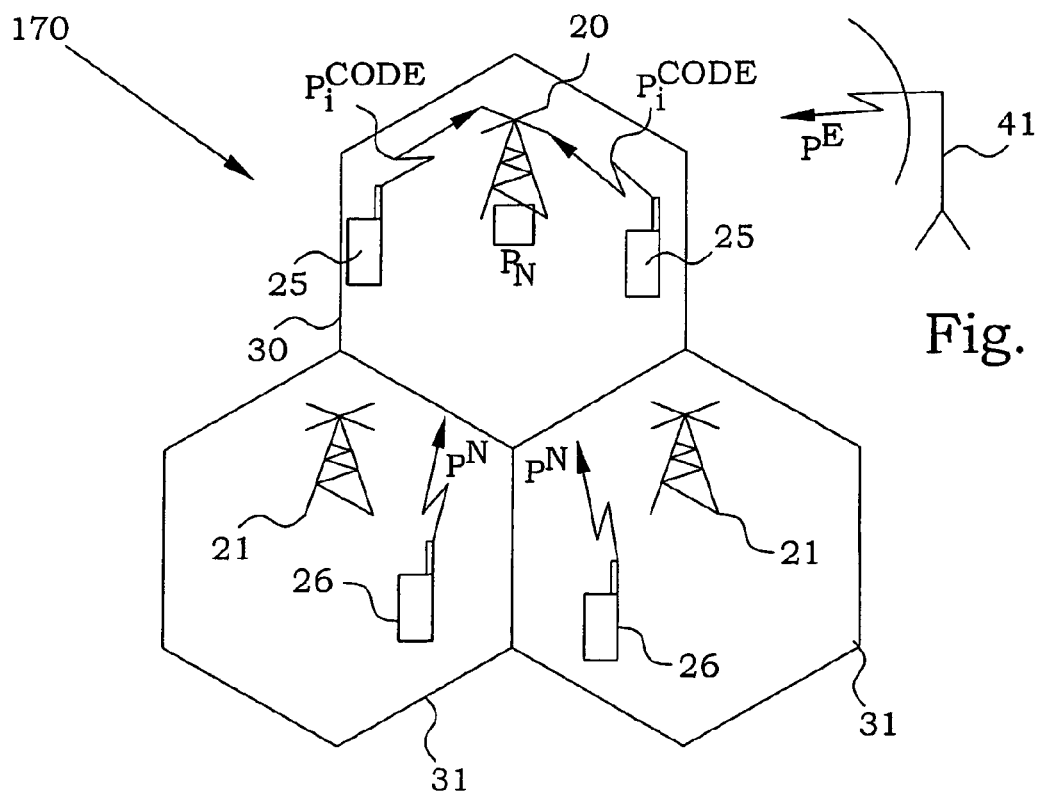
FIG. 2 is a schematic illustration of signal powers occurring in a typical mobile communications network.

FIG. 2 illustrates the contributions to power measurements in connection with an RBS 20 in a wireless communication, system 170. The RBS 20 is associated with a cell 30. Within the cell 30, a number of mobile terminals 25 are present, which communicate with the RBS 20 over different links, each contributing to the total received power by $P_i^{Code}(t)$. The cell 30 has a number of neighbouring cells 31 within the same WCDMA system, each associated with a RBS 21. The neighbouring cells also comprise mobile terminals 26. The mobile terminals 26 emit radio frequency power and the sum of all such contributions is denoted by $P^N$. There may also be other network external sources of radiation, such as e.g. a radar station 41. Contributions from such external sources are denoted by $P^E$. Finally, the $P_N$ term, denoting the noise floor power, arises from the receiver itself.

A total wide band power measurement $P_{Measurement}^{RTWP}(t)$ can be expressed by:

$$P_{Measurement}^{Total}(t) = \sum_{i=1}^{n} P_i^{Code}(t) + P^{E+N}(t) + P_N(t) + e^{Total}(t), \quad (1)$$

where $$P^{E+N} = P^E + P^N, \quad (2)$$

and where $e^{RTWP}(t)$ models measurement noise.

It can be mathematically proved that a linear estimation of $P^{E+N}(t)$ and $P_N$ is not an observable problem. Only the sum $P^{E+N}+P_N$ is observable from the available measurements.

Some problems with the prior-art solutions were briefly addressed in the background section. For a deeper understanding, this is schematically illustrated in FIG. 3A. Momentary values 102 of a received or estimated total wideband power are here illustrated as a function of time. The values fluctuate considerably depending on the momentary load. It is known that the thermal noise floor contribution always is present, and consequently it can be concluded that if measurement uncertainties are neglected, the noise floor contribution has to be equal to or smaller than the minimum value 104 of the total received wideband power received within a certain period of time. If there is a reasonable probability that all code power contributions, neighbour cell contributions and other external contributions at some occasion are equal to zero, the minimum value 104 is a good estimation of the "true" noise floor 106. However, in all situations, it is certain that the minimum value 104 constitutes an upper limit of the unknown noise floor.

In order to improve the estimation of the noise floor, a recursive estimation filter can be applied to the series of measurements, providing estimates of the received total wideband power, as well as the variance thereof. The thermal noise power floor may then be estimated by soft algorithms.

When only the received total wideband power is available, and not the individual code powers, the probability that all code power contributions, neighbour cell contributions and other external contributions at some occasion are equal to zero varies with the average load. FIG. 3B illustrates a measurement situation where the average load of the RBS in question is larger than in FIG. 3A. This is obvious since it can easily be seen that the average received total wideband power is notably increased. The probability that all code power contributions are equal to or close to zero becomes lower. Another effect will be that when the long term average load of the system increases, then normally also the neighbour cell interference increases. The consequence is that the likelihood of total power measurements or estimations in the vicinity of the true noise floor 106 will be reduced. Measurement results very close to the true noise floor will also be less probable. All these effects will together result in that a determined minimum value 104 will be less appropriate as a noise floor estimation for high load situations. Consequently, a noise rise measure determined based on such a noise floor estimation will in general be underestimated, which in turn increases the risk for e.g. power rushes.

Figure 4:
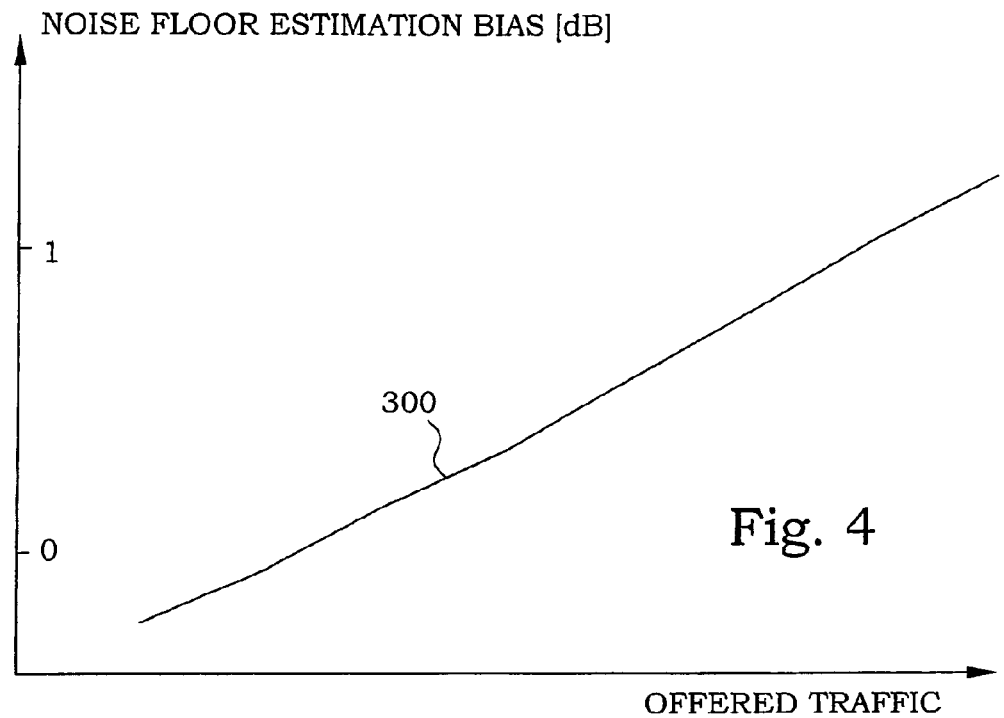
FIG. 4 is a diagram illustrating bias of a noise floor estimation as a function of load in the cell.

FIG. 4 illustrates a simulation result for the bias of the thermal noise floor as a function of load or offered traffic in a cell. The traffic was in this simulation speech traffic. The algorithms still work well for moderately loaded systems, like the present and near future WCDMA systems. However, for the very high loads which are foreseen when the demands for high uplink throughput increase, the algorithms previously used do not fully succeed in finding the true minimum value corresponding to zero momentary load. The result is as seen in FIG. 4 an estimated noise floor that is too high, typically between 0.5 and 1.0 dB for high loads.

According to the present invention, a measure representing a long term behaviour of a noise rise measure is registered. This measure, representing long term behaviour, thus in some sense corresponds to or is associated with the general load level that was present during a period in which the corresponding noise floor determination, on which the noise rise measure is based, was made. A correlation between a bias of the noise floor determination and the measure of the long term behaviour can be obtained, either theoretically or empirically. The present measure of the long term behaviour is then utilized for correcting any bias presently occurring in the noise floor determination, or quantity determined therefrom, as a result of the load.

Figure 5:
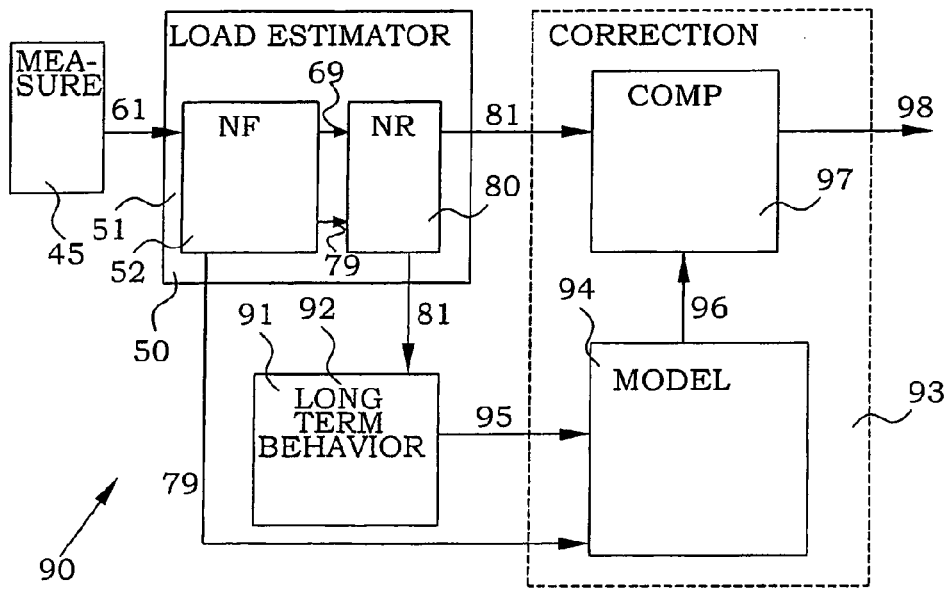
FIG. 5 is a block scheme of an embodiment of a noise rise estimation arrangement according to the present invention.

An embodiment of an arrangement 90 for determination of noise rise is illustrated in FIG. 5 as a block diagram. A power measuring means 45 is arranged for measuring at least received total wideband power a plurality of times. Measures 61 representing received total wideband power are provided to a load estimator 51, in the present embodiment a noise rise estimator arrangement 50. A means for computing 52 estimates of a noise floor measure receives the measures 61 and is arranged to base the estimates of the noise floor measure on at least the measures 61. The means for computing 52 provides estimates of the received total wideband power 69 as well as estimates of a noise floor measure 79 to a noise rise estimation block 80. The noise rise estimation block 80 is a means arranged for calculating values of a biased noise rise measure 81. The noise rise estimation block 80 is thereby arranged for basing the calculation on the estimated received total wideband power 69, and thereby indirectly on the measured received total wideband powers 61, and the estimate of the noise floor measure 79.

The biased noise rise measure 81 is according to the present invention utilized as information on which a correction of the bias may be performed. Bias as a function of the load, or more specifically, as a function of the present noise rise measure can be provided in different ways. One way is to simulate the interference situation, e.g. in connection with cell planning activities. A predetermined relation between bias and load can then be used. However, this has to be performed for each cell, individually. Another approach is to actually measure the relation, by using designed signalling conditions and actually measure the interference behaviour. This would, however, be very complex and will occupy network signalling resources.

In a preferred approach, each cell creates its own individual relation between bias and load during normal operation conditions. To this end, the biased noise rise measure 81 is provided to a means 91 for providing a measure that represents a long term behaviour of the values of the biased noise rise measure 81. In the present embodiment, the means 91 for providing a measure 95 that represents a long term behaviour is a long-term averaging section 92. Here, a measure 95 is obtained that is indicative to the biased noise rise measure 81 over a period that is associated with the time during which the noise floor value is achieved. In other words, there is a connection between the noise floor value obtained during such period and the obtained long term behaviour. In practice, this means that the time constant used in the averaging normally needs to be a little faster than the adaptation time constant of the noise floor estimator. In the present embodiment, an average is selected as indicative of a long term behaviour. However, other measures characterising a typical long term behaviour, such as median or any other statistical measure being connected to a typical value can be utilised.

In order to generate an independent variable for estimation of the noise floor bias, an average of the estimated uplink rise over thermal before bias compensation, is thus used in the present embodiment. For systems having more than one antenna branch, a separate average is used for each antenna branch. To avoid notational complications the equations that follow here below show the procedure for one antenna branch only. Rise over Thermal (RoT) is used as an exemplifying noise rise measure in the present embodiment. The averaging can e.g. be performed with a conventional autoregressive filter, i.e.:

$$\text{MeanRoT}(t)=\gamma\text{MeanRoT}(t-1)+(1-\gamma)\text{RoTEstimate}(t). \quad (3)$$

Here $\gamma$ denotes the filter constant, MeanRoT(t) denotes the averaged Rise over Thermal quantity at time t and RoTEstimate(t) is the estimated biased Rise over Thermal, i.e. before bias compensation.

The averaging filter of (3) needs to be tuned so that it reflects the average load over the effective time window where the noise floor estimator is active. This means that the time constant resulting from $\gamma$ preferably needs to be a little faster than the adaptation time constant of the noise floor estimator.

Also important, it is preferred for achieving a high estimation accuracy that the number of MeanRoT samples that are used for estimation of the bias, are balanced between the selected mean Rise over Thermal (amplitude) intervals. Put otherwise, in case a very high number of MeanRoT samples would be used in a low mean Rise over Thermal interval and very few MeanRoT samples in a higher mean Rise over Thermal interval, the result would be inaccurate in said high mean Rise over Thermal interval. This is because the estimator applied below focuses the accuracy of the bias model to intervals where there are most samples. Hence, to obtain a noise floor bias model that is accurate over a large MeanRoT signal range, it is essential that pre-filtering is applied so that the number of MeanRoT samples in each mean Rise over Thermal interval is not allowed to dominate completely. In other words, the samples are selected to have measures representing the long term behaviour of the values of the biased noise rise measure being spread over different measure intervals. This can in one embodiment be obtained as follows. A division of the MeanRoT range into subintervals is first introduced as $$\text{MeanRoTGrid}_i=(i-1)\text{meanRoTBinSize}, i=1, \ldots, M \quad (4)$$

The division may be done in the logarithmic or the linear domain, and may be generalized to be non-uniform. The preferred choice is to use the logarithmic domain. This defines the range intervals $$I_i=[\text{MeanRotGrid}_i, \text{meanRoTGrid}_{i+1}], i=1, \ldots, M-1. \quad (5)$$

The following variables are then defined $$\text{BiasUpdateAllowed}_i, i=1, \ldots, M-1 \quad (6)$$

$$\text{NumberOfBiasUpdates}_i, i=1, \ldots, M-1. \quad (7)$$

The variable of (6) is Boolean. It is controlled so that when an update (see further below) has been performed, using a value of the meanRoT in a certain interval $I_i$ then $$\text{NumberOfBiasUplates}_i:=\text{NumberOfBiasUppdates}_i+1 \quad (8)$$

$$\text{BiasUpdateAllowed}_i:=\text{'false'}$$

$$\text{BiasUpdateAllowed}_j:=\text{'true'}, j\neq i. \quad (9)$$

Equation (9) indicates that next time an update is to be performed, then data related to the previous amplitude interval is not allowed to be used. Equation (8) counts the number of bias estimation updates that have been performed so far, in each interval $I_i$. This information is used to control the application of bias compensation (see further below)

Again referring to FIG. 5, the measure 95 representing a long term behaviour of the biased noise rise measure is provided to a means 93 for obtaining an unbiased noise rise measure. Based on the measure 95 representing a long term behaviour of the biased noise rise measure, a corrected value of the noise rise measure is calculated. In the present embodiment, the means 93 for obtaining an unbiased noise rise measure comprises a model filter 94 and a compensation section 97. The model filter 94 of the present embodiment comprises a Kalman filter using a model representing a noise floor bias as a function of the long term behaviour. The model filter 94 needs, besides the measure 95 representing a long term behaviour of the biased noise rise measure also associated values of the noise floor 79. This is, however, readily obtainable from the means for computing 52 an estimate of a noise floor measure. The preferred selection of samples is described further above.

The model filter, i.e. the noise floor estimation model can be of many kinds. The linear model described here is presently considered to be the preferred embodiment, though. However, anyone skilled in the art realizes that also many other filter model approaches are possible to use. Hence, at each time instant t the noise floor bias model can be expressed as $$N_{Bias}(t)=b_0+b_1\text{meanRoT}(t)+e(t) \quad (10)$$

where $b_0$ and $b_1$ are model parameters, estimated as described below. The quantity $e_N(t)$ is a measurement disturbance. Note that if meanRoT(t) is computed in the logarithmic domain (preferred), then also $N_{Bias}(t)$ will be given in the logarithmic domain.

Since a recursive estimation scheme, in the form of a Kalman filter, is used below, dynamic models are needed for the parameters. As an example in this description the simplest case with random walk models is used, however as anyone skilled in the art realizes, more sophisticated dynamic models can also be used.

In order to describe these models, a new time index k is introduced, that is stepped when an update of the bias estimator takes place. The dynamic models become $$\begin{pmatrix} b_0(k+1) \\ b_1(k+1) \end{pmatrix} = \begin{pmatrix} 1 & 0 \\ 0 & 1 \end{pmatrix} \begin{pmatrix} b_0(k) \\ b_1(k) \end{pmatrix} + \begin{pmatrix} w_0(t) \\ w_1(t) \end{pmatrix}. \quad (11)$$

Here $(w_0(t)\ w_1(t))^T$ denotes the system noise (drift) term, with statistical properties given by $$E\left[\begin{pmatrix} w_0(t) \\ w_1(t) \end{pmatrix} (w_0(t)\ w_1(t))^T \right] = \begin{pmatrix} r_{1,11} & 0 \\ 0 & r_{1,22} \end{pmatrix}, \quad (12)$$

where $E[.]$ denotes statistical expectation.

In order to apply the Kalman filter, the state space model needs to be specified. Following the conventional notational convention, the following state space model is used in the present embodiment $$x(k+1)=A(k)x(k)+w(k)$$

$$y(k)=C(10x(k)+e(k), \quad (13)$$

where $x(k)$ is the state vector, $A(k)$ is the system matrix, $w(k)$ is the systems noise, $y(k)$ is the measurement vector, $C(k)$ is the measurement matrix and where $e(k)$ is the measurement noise. The noises fulfil $$R_1 = E\lfloor w(t)w^T(t)\rfloor, \quad (14)$$

$$R_2 = E\lfloor e(t)e^T(t)\rfloor, \quad (15)$$

where $^T$ denotes matrix transpose. With the above state space model, the Kalman filter estimate is obtained by the following recursive equations, as such well known in prior art $$K_f(k)=P(k|k-1)C^T(k)C(k)P(k|k-1)C^T(k)+R_2(k)^{-1}$$

$$\hat{x}(k|k)=\hat{x}(k|k-1)+K_f(k)(y(k)-C(k)\hat{x}(k|k-1))$$

$$P(k|k)=P(k|k-1)-K_f(k)C(k)P(k|k-1)$$

$$\hat{x}(k+1|k)=A(k)\hat{x}(k|k)$$

$$P(k+1|k)=A(k)P(k|k)A^T(k)+R_1. \quad (16)$$

The quantities introduced by the filter iterations (16) are as follows. $\hat{x}(k|k-1)$ denotes the state prediction, based on data up to bias update time k−1, $\hat{x}(k|k)$ denotes the filter update, based on data up to bias update time k, $P(k|k-1)$ denotes the covariance matrix of the state prediction, based on data up to bias update time k−1, and $P(k|k)$ denotes the covariance matrix of the filter update, based on data up to bias update time k. $C(k)$ denotes the measurement matrix, $K_f(k)$ denotes the time variable Kalman gain matrix, $R_2(k)$ denotes the measurement covariance matrix, and $R_1(k)$ denotes the system noise covariance matrix. It can be noted that $R_1(k)$ and $R_2(k)$ are often used as tuning variables of the filter. In principle the bandwidth of the filter is controlled by the matrix quotient of $R_1(k)$ and $R_2(k)$.

Now, by making associations using (10)-(16), it follows that the bias model results in the following variables, from which the Kalman filter can then be executed:

$$x(k) = \begin{pmatrix} b_0(k) \\ b_1(k) \end{pmatrix}, \quad (17)$$

$$A(k) = \begin{pmatrix} 1 & 0 \\ 0 & 1 \end{pmatrix}, \quad (18)$$

$$w(k) = \begin{pmatrix} w_0(k) \\ w_1(k) \end{pmatrix}, \quad (19)$$

$$y(k) = N_{bias}(k), \quad (20)$$

$$c(k) = (1\ \ meanRoT(k)) \quad (21)$$

$$e(k) = e_N(k), \quad (22)$$

$$R_1 = \begin{pmatrix} r_{1,11} & 0 \\ 0 & r_{1,22} \end{pmatrix}, \quad (23)$$

$$R_2 = E[e_n(t)]^2. \quad (24)$$

As an additional safety net it is useful to use the update of (16) only in case the estimated values of $b_0(k)$ and $b_1(k)$ remain within pre-specified lower and upper limits.

In such a way, a model is provided, with model parameters 96 estimated from the averaged biased noise rise measures and the noise floor estimations. These model parameters 96, in the above mathematical embodiment denoted $b_0(k)$ and $b_1(k)$, are provided to the compensation section 97. The compensation section 97 in this embodiment receives the present biased noise rise measure 81 from the noise rise estimation block 80 and based on the model parameters 96, an unbiased noise rise measure 98 is obtained.

In the present embodiment, the first action of the bias compensation section is to use the information stored in the variable numberOfBiasUpdates$_i$, In order to secure that an accurate estimate is in place for a specific cell, the following two conditions need to be fulfilled. First, the total number of bias estimation updates need to be above a pre-determined threshold. This is checked by summing the components of numberOfBiasUpdates$_i$, i.e. by computation of:

$$TotalNumberOFUpdates = \sum_{i=1}^{M-1} numberOfBiasUpdates_i. \quad (25)$$

Secondly, the number of intervals $I_i$ where numberOfBiasUpdates$_i$ is larger than a second threshold, needs to be larger than a third threshold.

Other variants of this logic are of course possible.

After the bias compensation has been activated by passing the test discussed above, an actual compensation of the RoT is performed at the output. In the present embodiment, this assumes that the uncompensated RoT estimate is given in the logarithmic domain and that the above calculations are related to the same domain.

Then $$RoT_{BiasCompensated}(t)=RoT(t)+b_1(k)meanRoT(k), \quad (26)$$

$$N_{BiasCompensated}(t)=N(t)-b_1(k)meanRoT(k). \quad (27)$$

This follows since the (logarithmic) bias is to be subtracted from the (logarithmic) noise floor estimate. Hence, due to the definition of RoT (which is given in the linear domain), (26) and (27) follow.

A number of observations are in order. The mean value of the RoT and the noise floor are computed from the uncompensated value of the RoT, before compensation for the noise floor bias. This avoids the possibility that the bias compensation starts to affect itself and the estimate of the noise floor.

Furthermore, note that different time scales are applied in (25).

Figure 6:
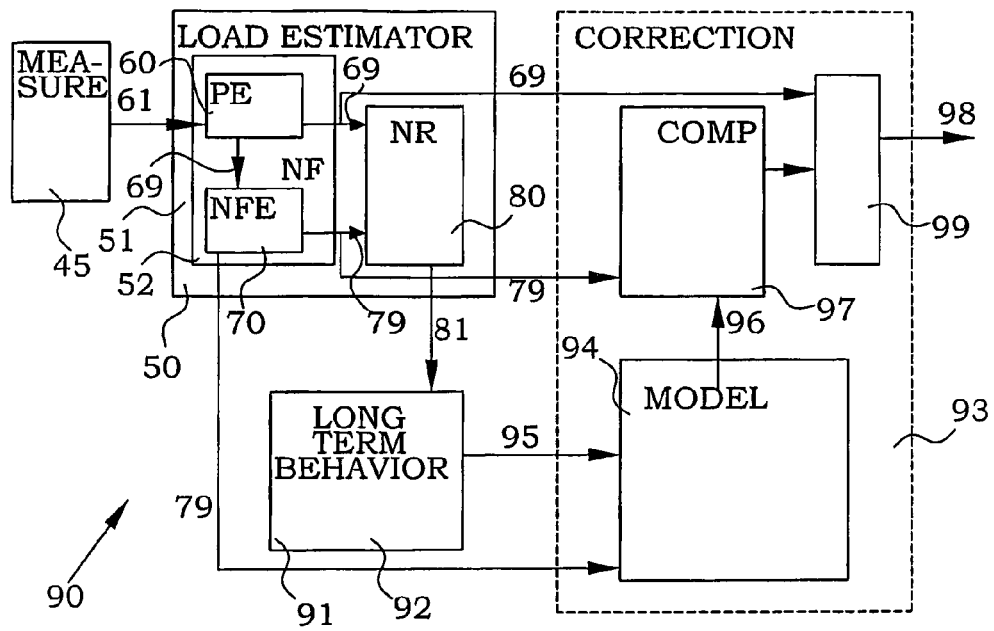
FIG. 6 is a block scheme of another embodiment of a noise rise estimation arrangement according to the present invention.

In the embodiment described above, a final compensation was performed directly on the noise rise value. FIG. 6 illustrates an alternative embodiment, where instead the noise floor is compensated, and a new noise rise value is calculated based on the compensated noise floor value. In other words, a present estimate of the noise floor measure is adjusted into an unbiased noise floor measure. The adjustment is based on a measure representing a long term behaviour of the biased noise rise measure. The value of a present, unbiased, noise rise measure is calculated based at least on received total wideband power measurements or estimates and on the new, unbiased noise floor measure. The means for computing 52 an estimate of a noise floor measure comprises in this embodiment a power estimation block 60. The output 69 from the power estimation block 60 is the estimate of the received total wideband power RTWP and the corresponding variance. Preferred embodiments are described more in detail further below. The output 69 from the power estimation block 60 is provided to a conditional probability distribution estimation block 70, where a noise floor measure 79 is obtained. Preferred embodiments are described more in detail further below.

When the compensation model is achieved in the model filter 94, the obtained model parameters 96 are provided to a compensation section 97. In this embodiment, however, the compensation section 97 compensates a biased noise floor value 69 received from the conditional probability distribution estimation block 70. This compensated, unbiased, noise floor value is used in a noise rise calculation section 99 together with the estimate of the received total wideband power 69 from the power estimation block 60 to calculate an unbiased noise rise measure 98. Note that the long term averaging and the model filtering is based on the biased noise rise measure 81.

Figure 7:
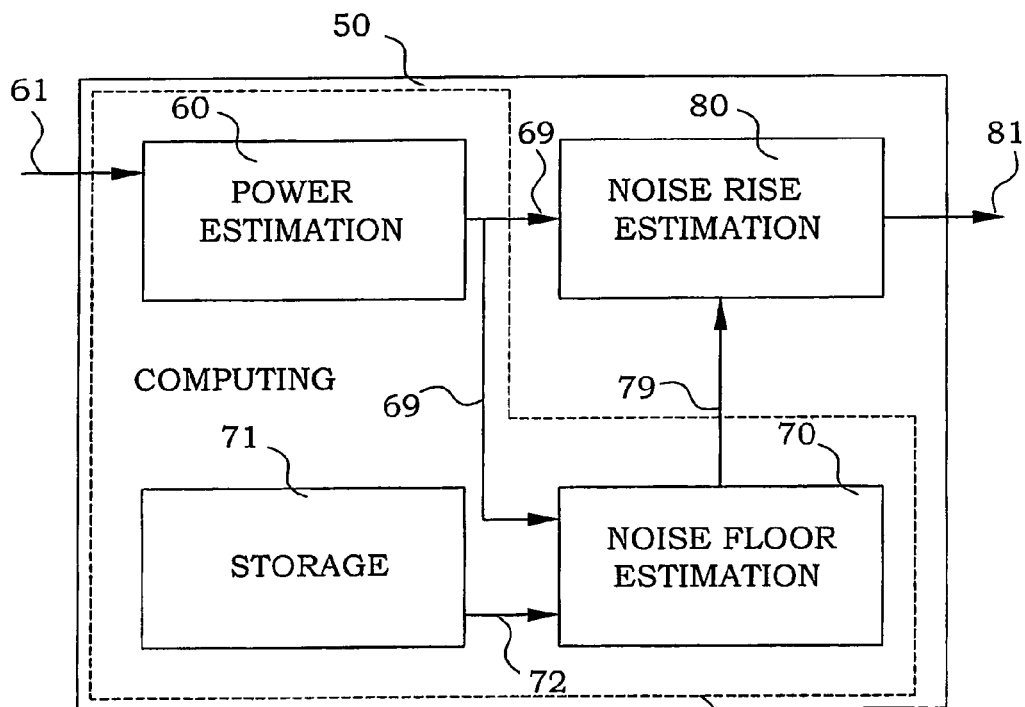
FIG. 7 is a block scheme of an embodiment of a part of the noise rise estimation arrangement according to FIG. 5.

The basic determination of the noise floor can be performed by any method being based on at least measurements of received total wideband power. The approach of WO 2006/076969, where a minimum value of a power quantity associated with received total wideband power is used as an estimate of an upper limit of the thermal noise floor, can be used. However, in a preferred embodiment, the optimal and soft algorithm for noise floor estimation disclosed in the published international patent application WO 2007/024166 is used. FIG. 7 illustrates a block diagram of an embodiment of such a setup.

A noise rise estimation arrangement 50 comprises three main blocks 60, 70, 80. In a first, power estimation block 60, a Kalman filter arrangement receives inputs 61, in the present embodiment the measured received total wideband power RTWP. Mathematical details of preferred embodiment are disclosed in Appendix A. The output 69 from the power estimation block 60 is the estimate of the received total wideband power RTWP and the corresponding variance. Since the outputs are from the Kalman filter arrangement, these parameter are the only ones needed to define the estimated Gaussian distribution that is produced by the filter. Thus, enough information is given to define the entire probability distribution information of the RTWP estimate.

In a second, conditional probability distribution estimation block 70, an arrangement based on Bayesian statistics receives the RTWP estimate and the corresponding standard deviation 69 as inputs, and provides an output 79 comprising parameters associated with a noise floor power. This may be a single value of a noise floor power or parameters of an estimated probability distribution of a noise floor power. Prior known parameters representing histograms of probability density functions of noise floor is stored in a storage 71 providing information 72 about a prior expected probability distribution of the noise floor power to the conditional probability distribution estimation block 70, in order to achieve an optimal estimation.

The effect on the subsequent noise power floor estimation processing block is beneficial, but intricate to understand. A highly technical explanation follows for the interested reader.

Note that when the long term average load of the system increases, then normally the neighbour cell interference increases. The consequence is that the likelihood of low values of the estimated total power is reduced with increasing neighbour cell interference. The soft noise power floor estimation algorithm operates by removing portions of the prior probability distribution of the thermal noise power floor, from above, by application of a calculation of the probability distribution of the minimum of the estimated total power. This moves the centre of gravity of the prior distribution towards lower values, thereby reducing the optimal estimate of the thermal noise power floor. The amount that is cut away is determined by the probability distributions of the estimated total power that fall within a pre-determined, sparsely sampled sliding window. Then a total power probability distribution with a larger variance will obviously cut away a larger portion of the prior probability distribution than one with the same mean value and a smaller variance. The reason is that the probability distribution function with the larger variance extends further into the region of nonzero support of the prior probability distribution.

The detailed mathematical description of the estimation of the conditional probability distribution is given in Appendix B.

The power estimation block 60, the conditional probability distribution estimation block 70 and the storage 71 together forms a means 52 for computing estimates of a noise floor measure.

In a third, noise rise estimation block 80, the estimated probability distribution of the noise floor 79 and the RTWP estimate and the corresponding standard deviation 69 are received as inputs, and provides primarily an output 81 comprising a noise rise value. In this embodiment, the preferred noise rise measure is defined according to:

$$RoT(t) = \frac{P^{Total}(t)}{P_N}, \quad (28)$$

where $P^{Total}(t)$ is a received total wideband power, however, as mentioned above also other noise rise measures can be utilized.

The blocks 60, 70 and 80 are preferably integrated into one processor. The means 93 (FIGS. 5 and 6) for obtaining an unbiased noise rise measure and the means 91 (FIGS. 5 and 6) for providing a measure that represents a long term behaviour of values of the biased noise rise measure are preferably also integrated in the same processor. The term "connected" then has the meaning of "having possibilities to exchange data". However, any arrangements comprising, but not limited to, different distributed solutions are also possible to use, where the processor means comprising the blocks 60, 70 and 80 may be considered as a distributed processor means.

Figure 8:
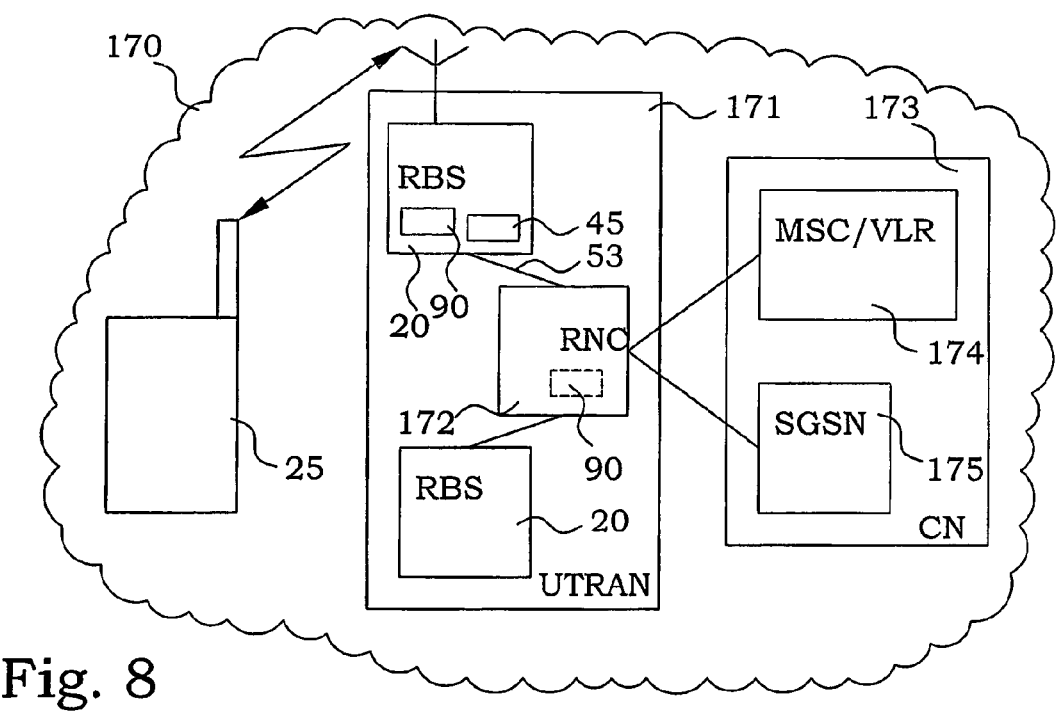
FIG. 8 is a block diagram of main parts of an embodiment of a system according to the present invention.

In the description above, it is assumed that the power estimations concern uplink communication. The power measurements are in such cases performed by a node in the radio access network, typically the radio base station. However, at least parts of the procedure, e.g. the providing, computing, calculating and/or obtaining steps may also be performed in other parts of the communication network, e.g. in a radio network controller. FIG. 8 illustrates main parts of an embodiment of a system according to the present invention. A wireless communications system 170 comprises a Universal mobile telecommunication system Terrestrial Radio Access Network (UTRAN) 171. A mobile terminal 25 is in radio contact with a RBS 20 in the UTRAN 171. The RBS 20 is controlled by a Radio Network Controller (RNC) 172, which in turn is connected to a Mobile services Switching Centre/Visitor Location Register (MSC/VLR) 174 and a Serving General packet radio system Support Node (SGSN) 175 of a core network CN 173.

In this embodiment, the RBS 20 comprises a power measuring means 45, typically an antenna and front end electronics, for measuring instantaneous received total wideband power, and an arrangement for determination of a noise rise estimate 90. These means 45 and 90 can be implemented as separate units or as at least partly integrated units.

In an alternative embodiment, the means 45, 90 are instead at least partly comprised in the RNC 172. At least a part of the actual measuring remains typically in the RBS 20 due to the proximity of the antenna. Also other alternative configurations are possible, as anyone skilled in the art realizes.

Figure 9:
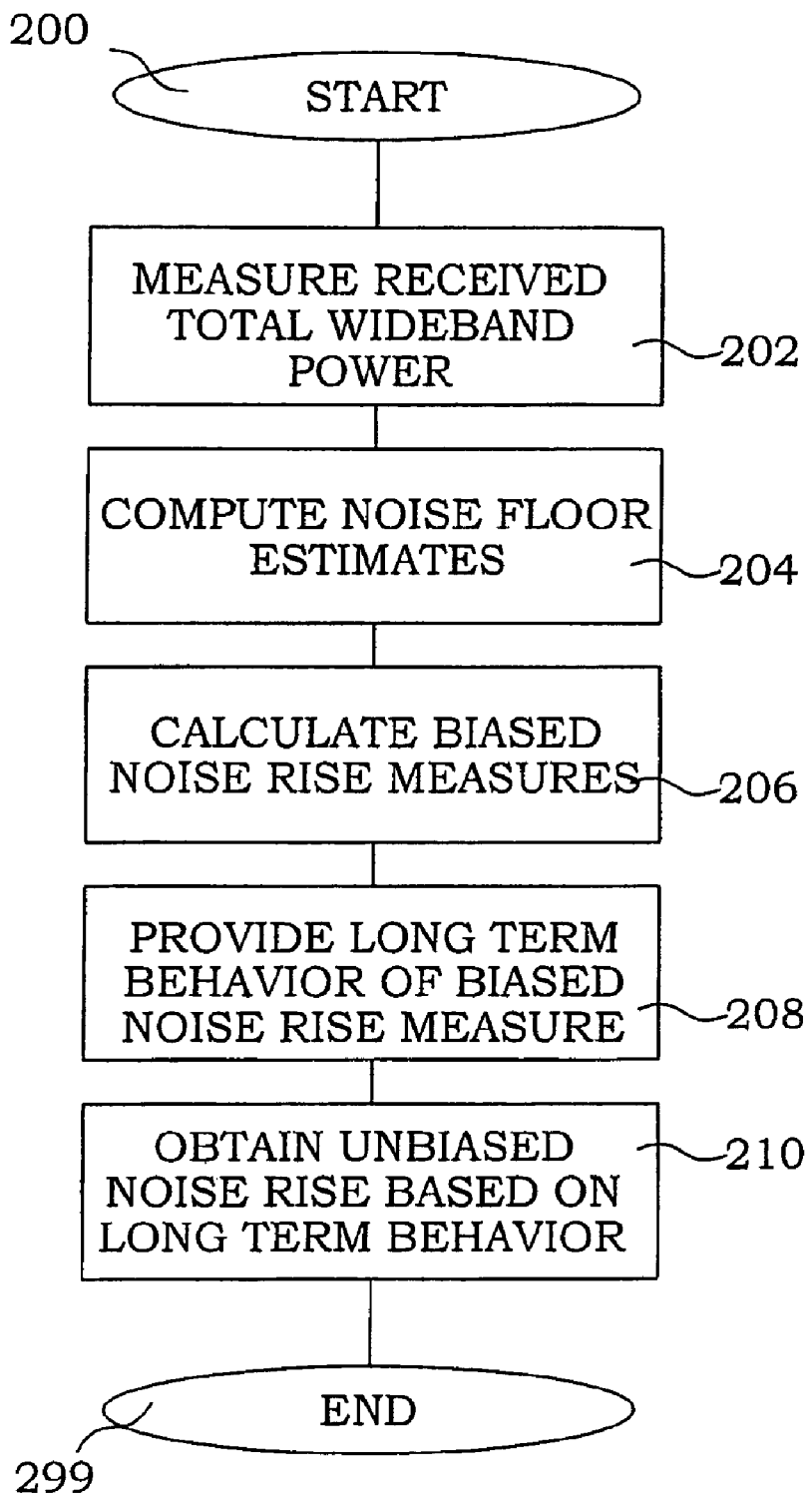
FIG. 9 is a flow diagram of main steps of an embodiment of a method according to the present invention.

FIG. 9 illustrates a flow diagram of main steps of an embodiment of a method according to the present invention. The procedure starts in step 200. In step 202, measurements of at least received total wideband power is made a plurality of times. In step 204, estimates of a noise floor measure is computed based on at least a number of the measured received total wideband powers. A plurality of values of a biased noise rise measure is calculated in step 206 based at least on a number of the measured received total wideband powers. This can be performed e.g. via an intermediate step, such as an estimated received total wideband power. In step 208, a measure representing a long term behaviour of the values of the biased noise rise measure is provided. Finally, in step 210, a value of a present, unbiased, noise rise measure is obtained, based at least on the measure representing a long term behaviour of the values of the noise rise measure. The procedure ends in step 299.

In the embodiments described above, the original input comprises measurements of received total wideband power. However, as indicated e.g. in WO 2007/024166, additional measurements and/or information ca also be of use when determining a noise floor value. By measuring additional quantities related to power a plurality of times, such information can be used together with the received total wideband power. The computation of estimates of noise floor as well as estimated values of received total wideband power can be further based on the measured additional quantities. Non-examples of such quantities are code powers and received scheduled enhanced uplink power (RSEPS).

Likewise, in the embodiments described above, the noise rise measure that is used for exemplifying is the rise over thermal (RoT) measure. However, in particular when additional power-related quantities are available, also other noise rise measures may be utilized in an analogue manner. Another noise rise measure includes e.g. in-band non-WCDMA interference with respect to the thermal noise floor.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

Appendix A

Kalman Filter for RTWP Measurements

A proposed algorithm for the case where the total RTWP is measured is a prediction-update filter, where the subscripts distinguish between the prediction and the update steps.

$$K_{Update}(t) = \frac{P^{Cov}_{Prediction}(t - T_{min})}{P^{Cov}_{Prediction}(t - T_{min}) + r_{Measurement}} \quad (A1)$$

$$P^{Total}_{Update}(t) = P^{Total}_{Prediction}(t - T_{min}) + K_{Update}(t) \times (P^{Total}_{Linear}(t) - P^{Total}_{Prediction}(t)) \quad (A2)$$

$$P^{Cov}_{Update}(t) = P^{Cov}_{Prediction}(t - T_{min}) - \frac{P^{Cov^2}_{Prediction}(t - T_{min})}{P^{Cov}_{Prediction}(t - T_{min}) + r_{Measurement}} \quad (A3)$$

$$P^{Total}_{Prediction}(t) = P^{Total}_{Update}(t) \quad (A4)$$

$$P^{Cov}_{Prediction}(t) = P^{Cov}_{Update}(t) + \frac{T_{min}}{T_{Correlation}} r \quad (A5)$$

(A1)-(A5) are repeated increasing t by steps of $T_{min}$.
Initialization is made at t=0 by:

$$P_{Prediction}^{Total}(0) = P_0^{Total} \quad (A6)$$

$$P_{Prediction}^{Cov}(0) = P_0. \quad (A7)$$

As seen above, the updating gain $K_{Update}(t)$ is as seen above computed from the model parameter $r_{measurement}$ and from a predicted covariance $P_{Prediction}^{Cov}(t-T_{min})$ obtained at the previous sampling instance. The total wideband power updated with the latest measurement $P_{Update}^{Total}(t)$ is then computed, using the prediction $P_{Prediction}^{Total}(t)$ and the new measurement $P_{Measurement}^{Total}(t)$. The next step is to compute the updated covariance $P_{Update}^{Cov}(t)$ from the predicted covariance and from $r_{Measurement}$. In the final steps of iteration new values of $P_{Prediction}^{Total}(t)$ and $P_{Prediction}^{Cov}(t)$ are calculated and the time is stepped. $T_{min}$ denotes the sampling period.

Appendix B

Estimation of the conditional probability distribution of $$\min_{t' \in [t-T_{Log}, t]} P^{Total}(t')$$

Note: It is very natural to estimate minimum powers. However, the choice to use the minimum value is really ad-hoc. In a general case, an extreme value of a quantity in some way dependent on the estimated $P^{Total}$ quantity would be possible to use as a base for the further computations. However, as a simplest embodiment the quantity $$\min_{t' \in [t-T_{Log}, t]} P^{Total}(t')$$

is considered here. Note that $P^{Total}$ in the coming discussion refers to the received total wideband power.

Notation, Conditional Probability and Baye's Rule

In the following Bayes rule and the definition of conditional mean, for probability distributions, are used extensively. The following definitions and results can be found e.g. in [1] pages 12-14, or any other text book on estimation.

Probability distributions: Consider two events A and B, with probability distributions $f_A(x)$ and $f_B(y)$, respectively. Then the joint probability distribution of A and B is denoted $f_{A,B}(x,y)$.

Note that the events and the conditioning are expressed by subscripts, whereas the independent variables appear within the parentheses. This notation is used only when probability distributions and cumulative probability distributions are used. When state estimates and covariances, e.g. of the Kalman filter, are referred to, the conditioning may also appear within parentheses.

Conditional probability distributions: The conditional probability distributions $f_{A|B}(x)$ and $f_{B|A}(y)$ are defined by:

$$f_{A,B}(x,y) = f_{A|B}(x)f_B(y) = f_{B|A}(y)f_A(x). \quad (B1)$$

Note that as a consequence of the notation for probability distributions, also the conditioning is expressed as subscripts.

A solution of the above equation now results in the famous Bayes rule:

$$f_{A|B}(x) = \frac{f_{B|A}(y)f_A(x)}{f_B(y)}. \quad (B2)$$

Note that the rules above are best understood by using intersecting circle diagrams. The formal proofs to obtain the results for probability distributions can e.g. use infinitesimal limiting versions of motivations for the probability cases.

Conditional Probability of the Minimum—Model and General Expressions

In this section some general properties of a minimum estimator are derived. Towards that end, the following notation is introduced. The Kalman filter or Kalman smoother estimate of $P^{Total}(t')$ denoted by:

$$\hat{x}_{p^{Total}}^{Kalman}(t' \mid Y') = \hat{x}_{p^{Total}}^{Kalman}(t' \mid \{y(s)\}_{s\in[-\infty,t]}) = \\ \hat{x}_{p^{Total}}^{Kalman}(t' \mid \{y(s)\}_{s\in[t-T_{Log},t]}, \hat{x}_{p^{Total}}^{Kalman}(t-T_{Log} \mid Y^{t-T_{Log}})). \quad (B3)$$

Here t' denotes some time within $\lfloor t-T_{Lag},t\rfloor$. The conditional distributions are, under mild conditions, all Gaussian sufficient statistics, i.e. only second order properties are needed in order to describe the conditional probability distributions. This is reflected in the conditioning in the last expression of (A3). The conditional distributions follow as:

$$f_{\hat{x}_{p^{Total}}^{Kalman}(t')|Y'}(x) \in N(\hat{x}_{p^{Total}}^{Kalman}(t' \mid t), (\sigma_{p^{Total}}^{Kalman}(t' \mid t))^2), \quad (B4)$$

where $^{Kalman}$ indicates that the estimate is computed with the Kalman filter or, if t'<t, the Kalman smoother. The quantities $\hat{x}_{p^{Total}}^{Kalman}(t'|t)$ and $(\sigma_{p^{Total}}^{Kalman}(t'|t))^2$ denote the power estimate and the corresponding covariance, respectively, i.e. the inputs to the estimator. Note that (B4) assumes that the corresponding estimate at time $t-T_{Lag}$ is used as initial value for the Kalman filter.

Then the conditional distribution for the minimum value of the power estimate can be further developed. Towards that end the following model is assumed for the relation between $x_{p^{Total}}^0(t')=P^{0,Total}(t')$ that represents the true power and $\hat{x}_{p^{Total}}^{Kalman}(t'|t)=\hat{P}^{Total}(t'|t)$ that represents the estimate:

$$x_{p^{Total}}^0(t')=\hat{x}_{p^{Total}}^{Kalman}(t'|t)+\Delta x_{p^{Total}}(t'|t) \quad (B5)$$

$$x_{p^{Total}}^0(t') \in N(\hat{x}_{p^{Total}}^{Kalman}(t'|t),(\sigma_{p^{Total}}^{Kalman}(t'|t))^2) \quad (B6)$$

This is in line with the above discussion on sufficient statistics. The notation for the distribution of $\Delta x_{p^{Total}}(t'|t)$ is henceforward simplified to:

$$f_{\Delta x}(x). \quad (B7)$$

Note that this distribution does not have to be assumed to be Gaussian (although this is mostly the assumption made).

The conditional probability distribution of the minimum value of $x_{p^{Total}}^0(t')=P^{0,Total}(t')$, $t' \in \lfloor t-T_{Lag},t \rfloor$ is then to be estimated using data y(t), obtained from the time interval $[-\infty,t]$. At this point it is suitable to refer to FIG. 4a, which shows the time intervals that are used in the development of the estimation algorithms that follow below.

FIG. 9 illustrates a diagram showing time variations 110 of a total received wideband power $P^{Total}(t)$. During some time intervals, the total received wideband power presents high values. However, at some occasions, the total received wideband power becomes small, indicating that many of the usual contributions to the measured power are absent.

As will be seen below, smoother estimates are theoretically required as inputs to the conditional probability estimation algorithm for the minimum power that operates over the time interval $\lfloor t-T_{Lag},t\rfloor$. To formally retain optimality in the development, the smoother estimates should also be calculated using all data in $\lfloor t-T_{Lag},t\rfloor$. However, in a practical implementation, these smoother estimates are typically computed using only a short snapshot of data around the selected smoothing time instance. Several such smoothing estimates, from $\lfloor t-T_{Lag},t\rfloor$, are then combined to estimate the conditional probability distribution. In the coming discussion the interval $\lfloor t-T_{Lag},t\rfloor$ is retained in all quantities though, so as not to complicate the development too much. A further simplification can be obtained by replacement of the smoother estimate with a Kalman filter estimate. Simulations indicate that this can be done with very little loss of performance.

The conditional distribution of the minimum value can now be written as follows (cf. (B5)):

$$f_{\min\{x_{p^{Total}}^0(t')\}_{t' \in [t-T_{Log},t]} \mid Y',\min x_{p^{Total}}^0(t-T_{Log})}(x), \quad (B8)$$

where the last quantity of (B8) denotes the initial information of the minimum value. In the following Bayes rule and the definition of conditional mean, for probability distributions, are used extensively.

Then apply Bayes rule and the definition of conditional probability to (B8) using the definitions:

A:=$\min\{x_{p^{Total}}^0(t')\}_{t' \in [t-T_{Lag},t]}$

B:=$\min x_{p^{Total}}^0(t-T_{Lag})$

C:=$Y_t$

The following chain of equalities then holds, using Bayes rule, the definition of conditional probability distributions, and the result $f_{B,C|A}(x,y)=f_{(B|A),(C|A)}(x,y)$ (the latter result is easily checked by the drawing of a three-circle diagram):

$$f_{A|B,C}(x) = \frac{f_{B,C|A}(x,y)f_A(x)}{f_{B,C}(x,y)} \quad \text{(B9)}$$

$$= \frac{f_{(B|A),(C|A)}(x,y)f_A(x)}{f_{B,C}(x,y)}$$

$$= \frac{f_{(B|A),(C|A)}(x)f_{C|A}(y)f_A(x)}{f_{B,C}(x,y)}$$

$$= \frac{f_{B|A,C}(x)f_{C|A}(y)f_A(x)}{f_{B,C}(x,y)}$$

$$= \frac{f_{B|A,C}(x)f_{A|C}(x)f_C(y)}{f_{B,C}(x,y)}.$$

The last step can again be easily verified by drawing circle diagrams. Now, according to the definitions above, the first factor of the numerator of (B9) is a prior and hence the conditioning disappears. The second factor of the numerator will be further expanded below, whereas the last factor of the numerator and the denominator can be treated as parts of a normalizing constant. Back-substitution of the definitions of A, B and C then proves the relation:

$$f_{\min\{x^0_{pTotal}(t')\}_{t' \in [t-T_{Log},t]}|Y',\min x^0_{pTotal}(t-T_{Log})}(x) = \quad \text{(B10)}$$

$$\frac{1}{c} f_{\min\{x^0_{pTotal}(t')\}_{t' \in [t-T_{Log},t]}|Y'}(x) f_{\min x^0_{pTotal}(t-T_{Log})}(x).$$

One consequence of (B10) that needs to be kept in mind is that a smoothing problem is at hand. The Kalman filtering based pre-processing step treated above hence formally needs to include a Kalman smoother step. In practice, the Kalman filter is normally sufficient though.

Final Expansion of the Conditional Mean of the Minimum Power

The starting point of this subsection is equation (B10) that states that the conditional pdf (probability distribution function) is given as the product of a prior (initial value) and a measurement dependant factor. The prior is supplied by the user and should reflect the prior uncertainty regarding $P_N$. Note that whenever the sliding window is moved and a new estimate is calculated, the same prior is again applied. The prior is hence not updated in the basic setting of the estimator.

To state the complete conditional pdf some further treatment of the first factor of (B10) is needed. The error distribution $f_{\Delta P}(x)$ of (B7), together with the definitions (B5) and (B6) will be central towards this end. Further, in the calculations below, F( ) denotes a cumulative distribution, i.e. the integral of f. Pr(.) denotes the probability of an event.

The following equalities now hold for the first factor of (B10):

$$F_{\min\{x^0_{pTotal}(t')\}_{t' \in [t-T_{Log},t]}|Y'}(x) = \quad \text{(B11)}$$

$$1 - Pr\left(\min\{x^0_{pTotal}(t')\}_{t' \in [t-T_{Log},t]} > x \mid Y'\right) =$$

$$1 - Pr(\forall t', \Delta x_{pTotal}(t' \mid t) > x - \hat{x}^{Kalman}_{Total}(t' \mid t)) =$$

$$1 - \prod_{t' \in [t-T_{Log},t]} Pr(\Delta x_{pTotal}(t' \mid t) > x - \hat{x}^{Kalman}_{Total}(t' \mid t)) =$$

-continued $$1 - \prod_{t' \in [t-T_{Log},t]} (1 - Pr(\Delta x_{pTotal}(t' \mid t) \le x - \hat{x}^{Kalman}_{Total}(t' \mid t))) =$$

$$1 - \prod_{t' \in [t-T_{Log},t]} \left(1 - F_{\Delta x(t' \mid t)}(x - \hat{x}^{Kalman}_{pTotal}(t' \mid t))\right).$$

The fourth equality of (B11) follows from the assumption that the Kalman smoother provides a sufficient statistics, i.e. (B5) and (B6). The last equality follows from (B7). Obviously, the most natural assumption is to use a Gaussian distribution for $F_{\Delta P(s)}$. However, (B11) actually allows other distributions as well.

The final step in the derivation of the first factor of the distribution function is to differentiate (B11), obtaining:

$$f_{\min\{x^0_{pTotal}(t')\}_{t' \in [t-T_{Log},t]}|Y'}(x) = \frac{dF_{\min\{x^0_{pTotal}(t')\}_{t' \in [t-T_{Log},t]}|Y'}(x)}{dx} = \quad \text{(B12)}$$

$$\sum_{t' \in [t-T_{Log},t]} f_{\Delta x(t' \mid t)}(x - \hat{x}^{Kalman}_{pTotal}(t' \mid t))$$

$$\prod_{\substack{q \in [t-T_{Log},t] \\ q \ne t'}} (1 - F_{\Delta x(t' \mid t)}(x - \hat{x}^{Kalman}_{pTotal}(t' \mid q)))$$

Combining with (B10), gives the end result:

$$f_{\min\{x^0_{pTotal}(t')\}_{t' \in [t-T_{Log},t]}|Y',\min x^0_{pTotal}(t-T_{Log})}(x) = \quad \text{(B13)}$$

$$\frac{1}{c}\left(\sum_{t' \in [t-T_{Log},t]} f_{\Delta x(t' \mid t)}(x - \hat{x}^{Kalman}_{pTotal}(t' \mid t))\right.$$

$$\left.\prod_{\substack{q \in [t-T_{Log},t] \\ q \ne t'}} (1 - F_{\Delta x(t' \mid t)}(x - \hat{x}^{Kalman}_{pTotal}(t' \mid q)))\right) f_{(\min x)^0_{pTotal}(t-T_{Log})}(x)$$

This result constitutes the output 79 referred to in connection with FIG. 7. The expression may look complex. It is fortunately straightforward to evaluate since it is a one dimensional function of Gaussian and cumulative Gaussian distributions given by:

$$f_{\Delta x(t' \mid t)}(x - \hat{x}^{Kalman}_{pTotal}(t' \mid t)) = \frac{1}{\sqrt{2\pi}\,\sigma^{Kalman}_{pTotal}(t' \mid t)} e^{-\frac{(x - \hat{x}^{Kalman}_{pTotal}(t' \mid t))^2}{2(\sigma^{Kalman}_{pTotal}(t' \mid t))^2}} \quad \text{(B14)}$$

$$F_{\Delta x(t' \mid t)}(x - \hat{x}^{Kalman}_{pTotal}(t' \mid t)) = \quad \text{(B15)}$$

$$\int_{-\infty}^{x - \hat{x}^{Kalman}_{pTotal}(t' \mid t)} f_{\Delta x(t' \mid t)}(y) dy = \frac{1}{2}\text{erfc}\left(-\frac{(x - \hat{x}^{Kalman}_{pTotal}(t' \mid t))}{\sqrt{2}\,\sigma^{Kalman}_{pTotal}(t' \mid t)}\right).$$

The quantities $\hat{x}^{Kalman}_{pTotal}(t'|t)$ and $\sigma^{Kalman}_{pTotal}(t'|t)$ are readily available as outputs from the Kalman smoother, or the simpler Kalman filter.

If a noise floor value is to be provided as an output, a mean value computation is performed on the output distribution.

The invention claimed is:

1. A method for noise rise estimation in a wireless communication system, comprising the steps of:
    measuring at least received total wideband power a plurality of times;
    computing a plurality of estimates of a noise floor measure based on at least a number of said measured received total wideband power;
    calculating a plurality of values of a biased noise rise measure, based at least on a number of said measured received total wideband power and a respective one of said estimates of a noise floor measure;
    providing a measure representing a long term behaviour of said values of said biased noise rise measure; and,
    obtaining a value of a present unbiased noise rise measure based at least on said measure representing a long term behaviour of said values of said biased noise rise measure.

2. The method according to claim 1, wherein said step of obtaining comprises adjusting of a present one of said plurality of values of a biased noise rise measure into said present unbiased noise rise measure based on said measure representing said long term behaviour.

3. The method according to claim 1, wherein said step of obtaining comprises adjusting of a present estimate of said noise floor measure into an unbiased noise floor measure based on said measure representing said long term behaviour, and calculating said value of a present unbiased noise rise measure based at least on a number of said measured received total wideband power and said unbiased noise floor measure.

4. The method according to claim 2, wherein said step of obtaining further comprises the steps of:
    creating a model representing a noise floor bias as a function of said long term behaviour of said values of said biased noise rise measure; and,
    filtering a plurality of samples of corresponding measures representing said long term behaviour and estimates of said noise floor measure, using said model, providing filtered model parameters;
    wherein said adjusting comprises subtraction of a quantity being a function of said filtered model parameters and a present said long term behaviour of said values of biased noise rise measure.

5. The method according to claim 4, wherein said samples are selected to have measures representing said long term behaviour of said values of said biased noise rise measure being spread over different measure intervals.

6. The method Method according to claim 4, wherein a time constant of said filtering of a plurality of samples is significantly longer than a characteristic time constant for said step of computing one of said estimates of said noise floor measure.

7. The method according to claim 1, wherein said measure representing said long term behaviour of said values of said biased noise rise measure is one of a long term average of said values of said biased noise rise measure and a long-term median of said values of said biased noise rise measure.

8. The method according to claim 1, wherein said step of computing a plurality of estimates of said noise floor measure comprises estimating of probability distributions for received total wideband power from at least said measured received total wideband powers, wherein said estimates of said noise floor measure are based on said probability distributions for received total wideband power.

9. The method according to claim 1, further comprising measuring of additional quantities related to power a plurality of times, wherein said step of computing a plurality of estimates of said noise floor measure is further based on said measured additional quantities related to power.

10. The method according to claim 1, wherein said biased noise rise measure and said unbiased noise rise measure are selected from the list group consisting of:
    rise over thermal; and,
    in-band non-WCDMA interference with respect to the thermal noise floor.

11. An apparatus for noise rise estimation in a wireless communication system, comprising:
    power measuring means for measuring at least received total wideband power a plurality of times;
    means connected to said power measuring means for computing estimates of a noise floor measure based on at least a number of said measured received total wideband power;
    means connected to said means for calculating values of a biased noise rise measure, based at least on a number of said measured received total wideband power and a respective one of said estimates of a noise floor measure;
    means connected to said means for calculating for providing a measure representing a long term behaviour of said values of said biased noise rise measure; and,
    means connected to said means for providing for obtaining a value of a present unbiased noise rise measure based at least on said measure representing a long term behaviour of said values of said biased noise rise measure.

12. The apparatus according to claim 11, wherein said means for obtaining is arranged for adjusting a present one of said values of said biased noise rise measure into said present unbiased noise rise measure based on said measure representing said long term behaviour.

13. The apparatus according to claim 11, wherein said means for obtaining is arranged for adjusting a present estimate of said noise floor measure into an unbiased noise floor measure based on said measure representing said long term behaviour and for calculating said value of a present unbiased noise rise measure based at least on a number of said measured received total wideband powers and said unbiased noise floor measure.

14. The apparatus according to claim 12, wherein said means for obtaining is further arranged for:
    creating a model representing a noise floor bias as a function of said long term behaviour of said values of said biased noise rise measure; and,
    filtering samples of corresponding measures representing said long term behaviour and estimates of said noise floor measure, using said model, providing filtered model parameters;
    wherein said means for obtaining is arranged for subtraction of a quantity being a function of said filtered model parameters and a present said long term behaviour of said values of biased noise rise measure.

15. The apparatus according to claim 14, wherein said means for obtaining is further arranged for selecting said samples for having measures representing said long term behaviour being spread over different measure intervals.

16. The apparatus according to claim 14, wherein a time constant of said filtering of samples is significantly longer than a characteristic time constant for computing one of said estimates of said noise floor measure as performed by said means for computing.

17. The apparatus according to claim 11, wherein said measure representing said long term behaviour of said values of said biased noise rise measure is one of a long term average of said values of said biased noise rise measure and a long-term median of said values of said biased noise rise measure.

18. The apparatus according to claim 11, wherein said means for computing is arranged for estimating of probability distributions for received total wideband powers from at least said measured received total wideband powers, wherein said estimates of said noise floor measure are based on said probability distributions for received total wideband power.

19. The apparatus according to claim 11, wherein said power measuring means is further arranged for measuring additional quantities related to power a plurality of times, wherein said means for computing is further arranged for computing said estimates of said noise floor measure based on said measured additional quantities related to power.

20. The apparatus according to claim 11, wherein said biased noise rise measure and said unbiased noise rise measure are selected from the group consisting of:
   rise over thermal; and
   in-band non-WCDMA interference with respect to the thermal noise floor.

* * * * *

UNITED STATES PATENT AND TRADEMARK OFFICE
CERTIFICATE OF CORRECTION

PATENT NO. : 8,306,091 B2
APPLICATION NO. : 12/678796
DATED : November 6, 2012
INVENTOR(S) : Wigren It is certified that error appears in the above-identified patent and that said Letters Patent is hereby corrected as shown below:

In the Specifications:

In Column 1, Line 32, delete "J the" and insert -- the --, therefor.

In Column 8, Line 18, Equation (8),
delete "NumberOfBiasUplates$_i$:=NumberOfBiasUppdates$_i$+1" and
insert -- NumberOfBiasUpdates$_i$:=NumberOfBiasUpdates$_i$+1 --, therefor.

In Column 8, Line 29, delete "below)" and insert -- below). --, therefor.

In Column 9, Line 25, Equation (13), delete "y(k)=C(10x(k)+e(k)," and insert
-- y(k)=C(k)x(k)+e(k), --, therefor.

In Column 9, Line 37, delete "$K_f(k)=P(k\mid k-1)C^T(k)C(k)P(k\mid k-1)C^T(k)+R_2(k)^{-1}$" and insert
-- $K_f(k)=P(k\mid k-1)C^T(k)(C(k)P(k\mid k-1)C^T(k)+R_2(k))^{-1}$ --, therefor.

In Column 13, Line 47, delete "ca" and insert -- can --, therefor.

In Column 14, Lines 53-54, delete " $\min_{t'\in[t-T_{Log},t]} P^{Total}(t')$ " and insert -- $\min_{t'\in[t-T_{Log},t]} P^{Total}(t')$ --, therefor.

In Column 14, Lines 64-65, delete " $\min_{t'\in[t-T_{Log},t]} P^{Total}(t')$ " and Signed and Sealed this
Twenty-first Day of May, 2013

Teresa Stanek Rea
*Acting Director of the United States Patent and Trademark Office*

CERTIFICATE OF CORRECTION (continued)
U.S. Pat. No. 8,306,091 B2 insert -- $\min_{t' \in [t-T_{Lag}, t]} P^{Total}(t')$ --, therefor.

In Column 15, Lines 45-46, delete " $\hat{x}_{pTotal}^{Kalman}(t' | Y^t) = \hat{x}_{pTotal}^{Kalman}(t' | \{y(s)\}_{s \in [-\infty, t]}) = \hat{x}_{pTotal}^{Kalman}(t' | \{y(s)\}_{s \in [t-T_{Lag}, t]}, \hat{x}_{pTotal}^{Kalman}(t - T_{Lag} | Y^{t-T_{Lag}}))$ " and insert -- $\hat{x}_{pTotal}^{Kalman}(t' | Y^t) \equiv \hat{x}_{pTotal}^{Kalman}(t' | \{y(s)\}_{s \in [-\infty, t]})$
$= \hat{x}_{pTotal}^{Kalman}(t' | \{y(s)\}_{s \in [t-T_{Lag}, t]}, \hat{x}_{pTotal}^{Kalman}(t - T_{Lag} | Y^{t-T_{Lag}}))$ --, therefor.

In Column 15, Line 58, delete " $f_{\hat{x}_{pTotal}^{Kalman}(t') | Y^t}(x) \in N(\hat{x}_{pTotal}^{Kalman}(t' | t), (\sigma_{pTotal}^{Kalman}(t' | t))^2),$ " and insert -- $f_{\hat{x}_{pTotal}^{Kalman}(t') | Y^t}(x) \in N(\hat{x}_{pTotal}^{Kalman}(t' | t), (\sigma_{pTotal}^{Kalman}(t' | t))^2)$ --, therefor.

In Column 16, Line 10, after Equation "(B6)" insert -- . --.

In Column 16, Lines 51-52, delete " $f_{\min\{x_{pTotal}^0(t')\}_{t' \in [t-T_{Lag}, t]} | Y^t, \min x_{pTotal}^0(t-T_{Lag})}(x),$ " and insert -- $f_{\min\{x_{pTotal}^0(t')\}_{t' \in [t-T_{Lag}, t]} | Y^t, \min x_{pTotal}^0(t-T_{Lag})}(x)$ --, therefor.

In Column 17, Lines 25-30, delete " $f_{\min\{x_{pTotal}^0(t')\}_{t' \in [t-T_{Lag}, t]} | Y^t, \min x_{pTotal}^0(t-T_{Lag})}(x) = \frac{1}{c} f_{\min\{x_{pTotal}^0(t')\}_{t' \in [t-T_{Lag}, t]} | Y^t}(x) f_{\min x_{pTotal}^0(t-T_{Lag})}(x) \cdot$ " and insert -- $f_{\min\{x_{pTotal}^0(t')\}_{t' \in [t-T_{Lag}, t]} | Y^t, \min x_{pTotal}^0(t-T_{Lag})}(x)$
$= \frac{1}{c} f_{\min\{x_{pTotal}^0(t')\}_{t' \in [t-T_{Lag}, t]} | Y^t}(x) f_{\min x_{pTotal}^0(t-T_{Lag})}(x)$ --, therefor.

CERTIFICATE OF CORRECTION (continued)
U.S. Pat. No. 8,306,091 B2

In Column 17, Lines 59-66, delete "[illegible equation block]" and insert --
$$F_{\min\{x^0_{pTotal}(t')\}_{t'\in[t-T_{Lag},t]}|Y^t}(x) = Pr\left(\min\{x^0_{pTotal}(t')\}_{t'\in[t-T_{Lag},t]} \leq x \mid Y^t\right) =$$

$$1 - Pr\left(\min\{x^0_{pTotal}(t')\}_{t'\in[t-T_{Lag},t]} > x \mid Y^t\right) =$$

$$1 - Pr\left(\forall\, t',\, \Delta x_{pTotal}(t'\mid t) > x - \hat{x}^{Kalman}_{pTotal}(t'\mid t)\right) =$$

$$1 - \prod_{t'\in[t-T_{Lag},t]} Pr\left(\Delta x_{pTotal}(t'\mid t) > x - \hat{x}^{Kalman}_{pTotal}(t'\mid t)\right) =$$
--, therefor.

In Column 18, Lines 2-7, delete "
$$1 - \prod_{t'\in[t-T_{Lag},t]}\left(1 - Pr(\Delta x_{pTotal}(t'\mid t) \leq x - \hat{x}^{Kalman}_{pTotal}(t'\mid t))\right) =$$

$$1 - \prod_{t'\in[t-T_{Lag},t]}\left(1 - F_{\Delta x(t'\mid t)}(x - \hat{x}^{Kalman}_{pTotal}(t'\mid t))\right).$$
" and insert --
$$1 - \prod_{t'\in[t-T_{Lag},t]}\left(1 - \Pr\left(\Delta x_{pTotal}(t'\mid t) \leq x - \hat{x}^{Kalman}_{pTotal}(t'\mid t)\right)\right) =$$

$$1 - \prod_{t'\in[t-T_{Lag},t]}\left(1 - F_{\Delta x(t'\mid t)}\left(x - \hat{x}^{Kalman}_{pTotal}(t'\mid t)\right)\right)$$
--, therefor.

In Column 18, Lines 20-27, delete "

$$f_{\min\{x^0_{pTotal}(t')\}_{t' \in [t-T_{Lag},t]}}^{y^t(x)}(x) = \frac{dF_{\min\{x^0_{pTotal}(t')\}_{t' \in [t-T_{Lag},t]}}^{y^t(x)}}{dx} =$$

$$\sum_{t' \in [t-T_{Lag},t]} f_{\Delta x(t'|t)}\left(x - \hat{x}^{Kalman}_{pTotal}(t' \mid t)\right)$$

$$\prod_{\substack{q \in [t-T_{Lag},t] \\ q \neq t'}} \left(1 - F_{\Delta x(t'|t)}\left(x - \hat{x}^{Kalman}_{pTotal}(t' \mid q)\right)\right)$$

" and insert --

$$f_{\min\{x^0_{pTotal}(t')\}_{t' \in [t-T_{Lag},t]}}^{y^t(x)}(x) = \frac{dF_{\min\{x^0_{pTotal}(t')\}_{t' \in [t-T_{Lag},t]}}^{y^t(x)}}{dx} =$$

$$\sum_{t' \in [t-T_{Lag},t]} f_{\Delta x(t'|t)}\left(x - \hat{x}^{Kalman}_{pTotal}(t' \mid t)\right)$$

$$\prod_{\substack{q \in [t-T_{Lag},t] \\ q \neq t'}} \left(1 - F_{\Delta x(t'|t)}\left(x - \hat{x}^{Kalman}_{pTotal}(t' \mid q)\right)\right) \cdot$$

--, therefor.

In Column 18, Lines 34-42, delete "

$$f_{\min\{x^0_{pTotal}(t')\}_{t' \in [t-T_{Lag},t]}}^{y^t, \min x^0_{pTotal}(t-T_{Lag})}(x) =$$

$$\frac{1}{c}\left(\sum_{t' \in [t-T_{Lag},t]} f_{\Delta x(t'|t)}\left(x - \hat{x}^{Kalman}_{pTotal}(t' \mid t)\right)\right.$$

$$\left.\prod_{\substack{q \in [t-T_{Lag},t] \\ q \neq t'}} \left(1 - F_{\Delta x(t'|t)}\left(x - \hat{x}^{Kalman}_{pTotal}(t' \mid q)\right)\right)\right)^{f_{\min x^0_{pTotal}(t-T_{Lag})}(x)} \cdot$$

" and insert --

--, therefor.

In the Claims:

In Column 19, Line 48, in Claim 6, delete "Method".

In Column 20, Line 5, in Claim 10, delete "list".

In Column 22, Line 6, in Claim 20, delete "and" and insert -- and, --, therefor.